(12) United States Patent
Hu

(10) Patent No.: US 11,416,361 B2
(45) Date of Patent: Aug. 16, 2022

(54) COMPUTER SYSTEM AND DEBUGGING METHOD THEREOF

(71) Applicant: Wistron Corporation, New Taipei (TW)

(72) Inventor: Chih-Hsien Hu, New Taipei (TW)

(73) Assignee: Wistron Corporation, New Taipei (TW)

(*) Notice: Subject to any disclaimer, the term of this patent is extended or adjusted under 35 U.S.C. 154(b) by 583 days.

(21) Appl. No.: 16/505,722

(22) Filed: Jul. 9, 2019

(65) Prior Publication Data

US 2020/0301796 A1    Sep. 24, 2020

(30) Foreign Application Priority Data

Mar. 22, 2019  (TW) ................. 108109992

(51) Int. Cl.
*G06F 11/00*  (2006.01)
*G06F 11/22*  (2006.01)
(Continued)

(52) U.S. Cl.
CPC ........ *G06F 11/2284* (2013.01); *G06F 11/221* (2013.01); *G06F 11/321* (2013.01); *G06F 13/4282* (2013.01); *G06F 2213/0026* (2013.01)

(58) Field of Classification Search
CPC .. G06F 11/079; G06F 11/221; G06F 11/2221; G06F 11/2284; G06F 11/321;
(Continued)

(56) References Cited

U.S. PATENT DOCUMENTS

| 6,148,419 A * | 11/2000 | Ahrens ................. G06F 11/327 714/48 |
| 2013/0268744 A1 | 10/2013 | Chan et al. |
| 2016/0155514 A1* | 6/2016 | Lai ..................... G11C 29/4401 714/723 |

FOREIGN PATENT DOCUMENTS

| EP | 0687977 A2 * | 12/1995 |
| TW | 201314576 | 4/2013 |
| TW | 201342044 | 10/2013 |

OTHER PUBLICATIONS

Zhang et al., "Enable PCI Express Advanced Error Reporting in the Kernel", Intel Corporation, 2007 Linux Symposium, vol. Two, pp. 297-304 (Year: 2007).*

(Continued)

*Primary Examiner* — Michael Maskulinski
(74) *Attorney, Agent, or Firm* — JCIPRNET

(57) ABSTRACT

A computer system and a debugging method thereof are provided. The computer system includes a circuit board, a memory, a circuit board image, and a processor. The circuit board includes a plurality of connection interfaces configured to be electrically coupled to a plurality of hardware devices. The memory stores a basic input/output system program. The basic input/output system program includes a power-on self-test program. The processor loads the basic input/output system program to perform a boot process when the computer system is powered on, reads and executes the power-on self-test program to detect the hardware devices electrically coupled to the connection interfaces, displays the circuit board image on a display, and displays a mark pattern on the circuit board image corresponding to a position of a connection interface image of an abnormal hardware device when the hardware device is detected to be abnormal.

20 Claims, 5 Drawing Sheets

(51) Int. Cl.
*G06F 13/42* (2006.01)
*G06F 11/32* (2006.01)

(58) Field of Classification Search
CPC .... G06F 11/324; G06F 11/327; G06F 9/4406; G06F 9/4411
See application file for complete search history.

(56) References Cited

OTHER PUBLICATIONS

"Office Action of Taiwan Counterpart Application", dated Apr. 15, 2020, p. 1-p. 8.

\* cited by examiner

COMPUTER SYSTEM AND DEBUGGING METHOD THEREOF

CROSS-REFERENCE TO RELATED APPLICATION

This application claims the priority benefit of Taiwan application serial no. 108109992, filed on Mar. 22, 2019. The entirety of the above-mentioned patent application is hereby incorporated by reference herein and made a part of this specification.

BACKGROUND

Technical Field

The disclosure relates to a computer debugging technique. More particularly, the disclosure relates to a computer system and a debugging method thereof configured for displaying a hardware detection result of the computer system.

Description of Related Art

Regardless of a client computer system or a server computer system, when the computer system is started, the basic input/output system generally performs the power-on self-test process to self-diagnose the status of each of the connection interfaces and to self-diagnose whether the hardware device connected to each of the connection interfaces functions normally, or a debugging process is activated through intervention operation or remote monitoring (e.g., in the BMC Web interface through the RAS function) performed by a technician, so that the foregoing diagnosis is performed. Conventionally, the detection result is displayed on the screen or an additionally installed screen, or a debugging code is presented through a display or a light-emitting device, so that the technician may visually determine or may look up a table to determine the connection interface or the hardware device of which the error occurs and the type of the error. Nevertheless, as for general users or other non-professional technicians who are unfamiliar with the computer hardware architecture or the meaning of the debugging codes, it is not easy for them to figure out the connection interface(s) or the hardware device(s) of which the error occurs. As such, they are unable to solve the problem by themselves, and they are unable to smoothly communicate with and report to the technicians of the connection interface(s) or the hardware device(s) of which the error occurs. Therefore, the entire diagnosis and repair operations become time-consuming so that the problem cannot be instantly addressed and solved through the conventional debugging display method of the computer system. Accordingly, a solution is provided by the disclosure to solve the foregoing problem.

SUMMARY

The disclosure provides a computer system and a debugging method thereof capable of providing instant installation abnormality information through a graphical debugging result.

A computer system provided by the disclosure includes a circuit board, a memory, a circuit board image, and a processor. The circuit board includes a plurality of connection interfaces configured to be electrically coupled to a plurality of hardware devices. The memory is installed on the circuit board. A basic input/output system program configured to execute a boot process is stored in the memory. The basic input/output system program includes a power-on self-test program. The circuit board image is stored in the memory or in any memory on the circuit board. A circuit layout of the circuit board image corresponds to a circuit layout of the circuit board. The processor is configured to load the basic input/output system program to perform the boot process when the computer system is powered on, and read and execute the power-on self-test program to detect the hardware devices electrically coupled to the connection interfaces, display the circuit board image one a display, and display a mark pattern on the circuit board image corresponding to a position of a connection interface image of an abnormal hardware device when the abnormal hardware device is detected to be abnormal.

A debugging method of a computer system provided by the disclosure includes the following steps: powering on and executing a basic input/output system program to perform a boot process; executing a power-on self-test program to detect a plurality of hardware devices electrically coupled to a plurality of connection interfaces; displaying a circuit board image corresponding to a circuit layout of a circuit board on a display; and displaying a mark pattern on the circuit board image corresponding to a position of a connection interface image of an abnormal hardware device when the hardware device is detected to be abnormal.

To sum up, the computer system and the debugging method thereof of the disclosure according to some embodiments are capable of displaying the circuit board image marked with the position of the connection interface image corresponding to the hardware device detected to be abnormal, so as to provide the instant debugging information of the hardware device.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
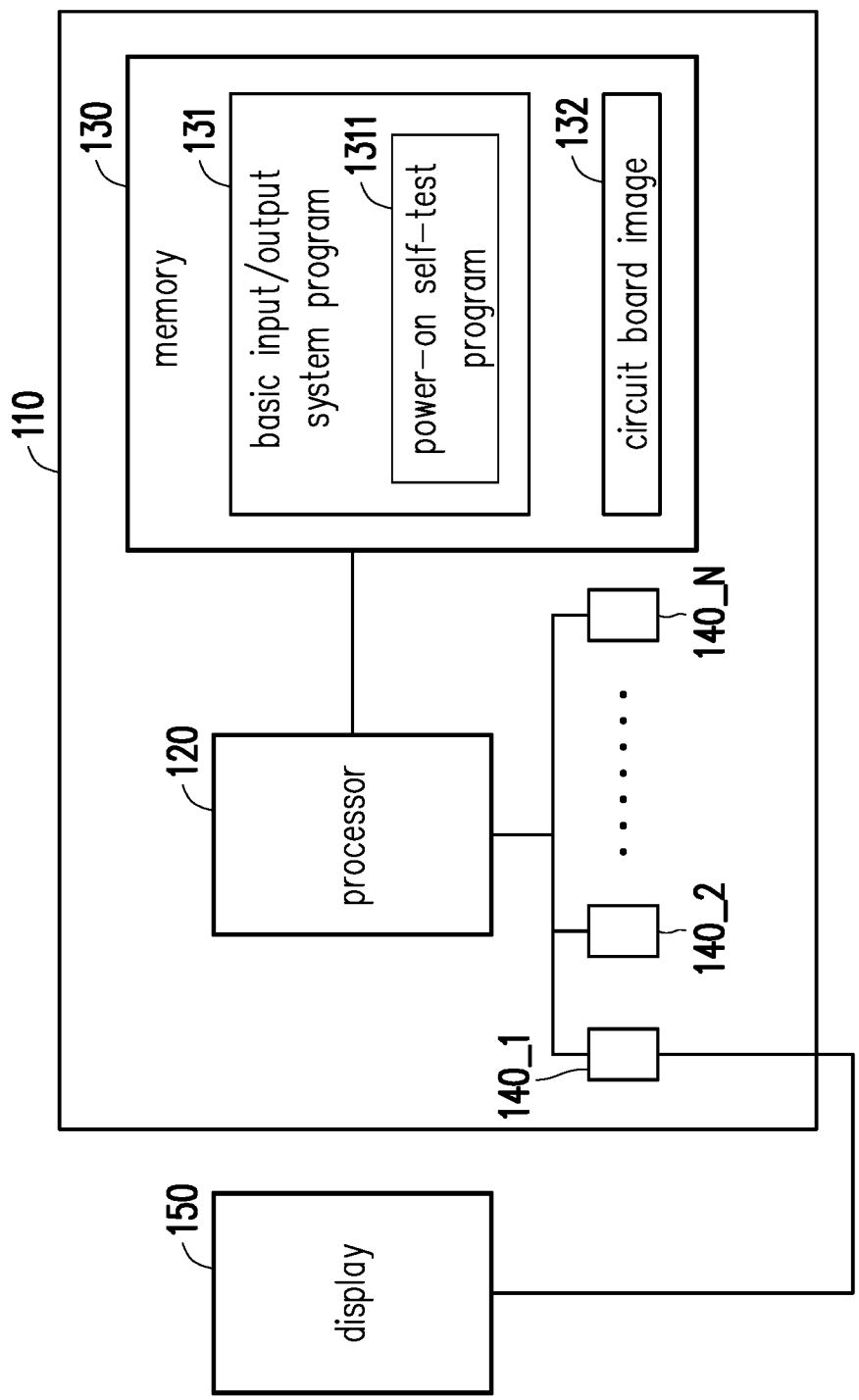
FIG. 1 is a schematic block diagram of a computer system according to an exemplary embodiment of the disclosure.

In order to make the disclosure more comprehensible, several embodiments of the disclosure are introduced herein to describe the disclosure, but the disclosure is not limited by the embodiments. Suitable combinations among the embodiments are also allowed. Moreover, elements/components/ steps with the same reference numerals are used to represent the same or similar parts in the drawings and embodiments.

FIG. 1 is a schematic block diagram of a computer system according to an exemplary embodiment of the disclosure. With reference to FIG. 1, a computer system 100 includes a circuit board 110, a processor 120, and a display 150. The circuit board 110 is electrically coupled to the processor 120 and the display 150. The circuit board 110 may be, for example, a mainboard and includes a memory 130 and a plurality of connection interfaces 140_1 and 140_2 to 140_N. N is an integer greater than zero. The memory 130 may be a read-only memory (ROM), an electrically-erasable programmable read-only memory (EEPROM), a flash ROM and the like. The memory 130 may be configured to store a basic input/output system (BIOS) program 131 and a circuit board image 132. In this embodiment, a circuit layout of the circuit board image 132 corresponds to a circuit layout of the circuit board 110. Nevertheless, in an embodiment, the circuit board image 132 may be stored in any memory, not limited to the memory 130, on the circuit board 110.

In this embodiment, the basic input/output system program 131 includes a power-on self-test (POST) program 1311. It should be noted that the basic input/output system program 131 refers only to a general term herein and may refer to any firmware that is loaded and initialized to tests hardware installations and elements before an operating system is activated when a computer is powered on, such as a unified extensible firmware interface (UEFI). In this embodiment, the connection interfaces 140_1 and 140_2 to 140_N of the circuit board 110 may refer to any input/output ports (I/O ports) or buses and may be configured to be coupled to the hardware devices or hardware elements (referred to hardware devices hereinafter). For example, the connection interface 140_1 is electrically coupled to the display 150.

In this embodiment, when the computer system 100 is powered on, the basic input/output system program 131 is loaded by the processor 120 to execute a boot process. The processor 120 reads and executes the power-on self-test program 1311 in the basic input/output system program 131 to detect the connection interfaces 140_1 and 140_2 to 140_N and detect whether the hardware devices electrically coupled to the connection interfaces 140_1 and 140_2 to 140_N are abnormal. Such abnormality may mean that a specific hardware device cannot run normally owing to a specific reason. In this embodiment, the connection interfaces 140_1 and 140_2 to 140_N may include, for example, a Peripheral Component Interconnect Express (PCIe) connection interface, a dual in-line memory module (DIMM) connection interface, a video graphics array (VGA) connection interface, a local area network (LAN) connection interface, a universal serial bus (USB) connection interface, a CPU socket and the like, and the disclosure is not limited thereto.

In this embodiment, when at least one of various types of the hardware devices electrically coupled to the connection interfaces 140_1 and 140_2 to 140_N is abnormal and the boot process is thus hanged out, the displays 150 may display a debugging result interface including the circuit board image 132, and the processor 120 marks a position on the circuit board image 132 corresponding to a connection interface image of the hardware device detected to be abnormal. In other words, when the computer system 100 of this embodiment runs a power-on self-test process (or running any debugging execution command), if the boot process is hanged out owing to a specific abnormal hardware device, the computer system 100 displays a graphical debugging result through the display 150 to visually inform a user of information related to which one of the hardware devices cannot work normally. That is, the user may see a marking result on the circuit board image 132 corresponding to the connection interface image of the hardware device detected to be abnormal through the display 150, so that the user may quickly eliminate the abnormal situation of installations.

However, in an embodiment, if one hardware device is abnormal but the abnormal hardware device does not cause the boot process to be hanged out, the computer system 100 may continue to execute the boot process, and the graphical debugging result may be automatically displayed not during the power-on self-test process. In another embodiment, the graphical debugging result may be automatically displayed during the power-on self-test process. Alternatively, in another embodiment, during the power-on self-test process, the computer system 100 may display the graphical debugging result based on a specific operation performed by the user (e.g., pressing a specific function key to enter a basic input/output setup interface). Accordingly, since the power-on self-test program 1311 records information related to installation abnormality, in the following boot process, the user may obtain the information related to installation abnormality on other operation interfaces. For example, in a server type computer system 100, regardless of whether an abnormal hardware device causes hanging out of the boot process, the user may still remotely view the graphical debugging result through entering a specific management web interface (e.g., a baseboard management controller web (BMC Web)).

Figure 2:
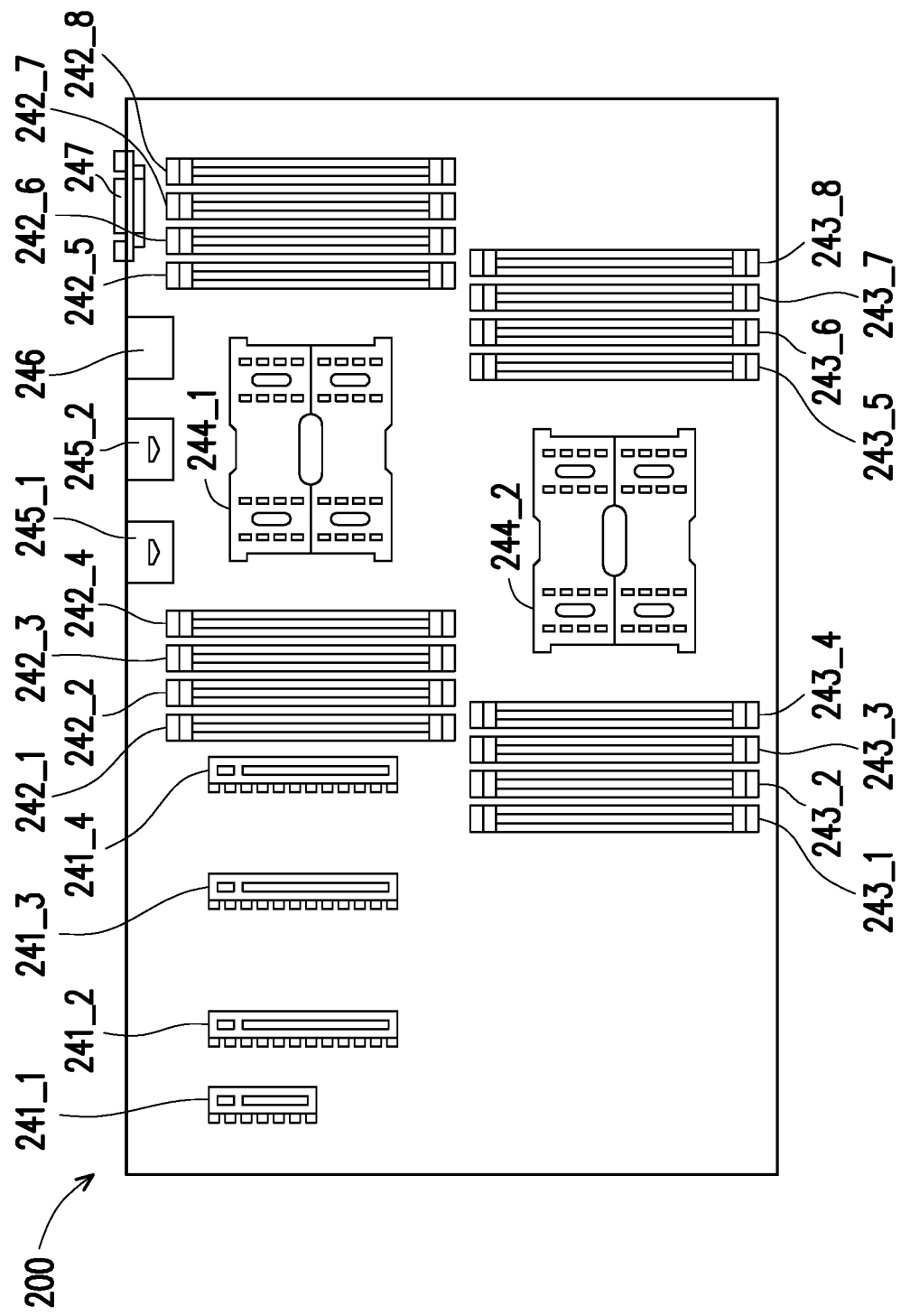
FIG. 2 is a schematic diagram of a circuit board image according to an exemplary embodiment of the disclosure.
Figure 3:
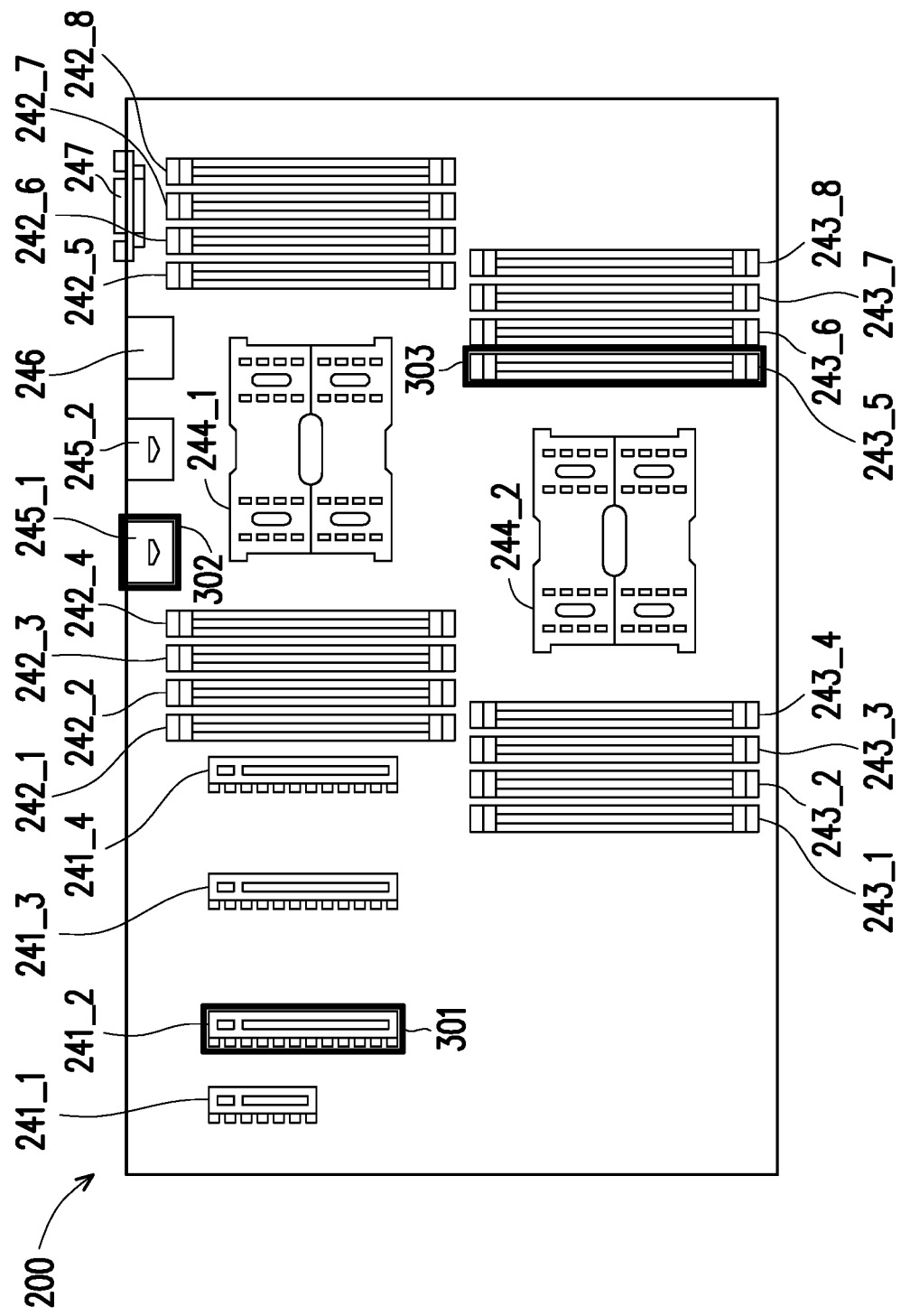
FIG. 3 is a schematic diagram of the circuit board image marked with a position of a hardware device detected to be abnormal according to an exemplary embodiment of FIG. 2 of the disclosure.

FIG. 2 is a schematic diagram of a circuit board image according to an exemplary embodiment of the disclosure. FIG. 3 is a schematic diagram of the circuit board image marked with a position of a hardware device detected to be abnormal according to an exemplary embodiment of FIG. 2 of the disclosure. With reference to FIG. 1 and FIG. 2 first, the display 150 may display a circuit board image 200 as shown in FIG. 2 in the debugging process or in the detection process. In this embodiment, the connection interface image 200 includes PCIe connection interface images 241_1 to 241_4, DIMM connection interface images 242_1 to 242_8 and 243_1 to 243_8, CPU outlet images 244_1 and 244_2, USB connection interface images 245_1 and 245_2, LAN connection interface image 246, and VGA connection interface image 247. In this embodiment, the circuit board image 200 may be stored in the memory 130 or in any type of memory (e.g., a flash memory, a solid state drive, a hard disk drive, etc.) on the circuit board 110 in advance and is matched with and corresponds to the circuit board 110 actually installed in the computer system 100. The matching or corresponding manner may be that circuit layouts of the circuit board image 200 and the circuit board 110 are completely identical or similar, or the circuit board image 200 serves merely as a schematic circuit layout of the circuit board 110. In this embodiment, when the power-on self-test program 200 detects that a hardware device is abnormal, the display 150 displays a debugging interface including the circuit board image 200 as shown in FIG. 2.

Then, with reference to FIG. 1 and FIG. 3, the processor 120 may mark a position on the circuit board image 200 corresponding to a connection interface image of the hardware device detected to be abnormal. To be specific, it is assumed that when hardware devices respectively corresponding to the PCIe connection interface image 241_2, the USB connection interface image 245_1, and the DIMM connection interface image 243_5 are detected to be abnormal, the basic input/output system program 131 may obtain status codes and connection interface numbers corresponding to the hardware devices detected to be abnormal, and the basic input/output system program 131 may read a lookup table to obtain a plurality of corresponding coordinate parameters (coordinate X and coordinate Y) as shown in Table 1 below. In this regard, the processor 120 may mark the positions on the circuit board image 200 corresponding to the PCIe connection interface image 241_2, the USB connection interface image 245_1, and the DIMM connection interface image 243_5 of the hardware devices detected to be abnormal according to the coordinate parameters. Herein, numbers of the status code, numbers of the connection interface number, and the corresponding relationships between the status code and the connection interface number in Table 1 act merely as hypothetical and exemplary examples.

| Status Code | Connection Interface Number | Coordinate X | Coordinate Y |
|---|---|---|---|
| 0x15 | DIMM2-5 | 300 | 0 |
| 0x92 | PCIe Slot2 | 50 | 50 |
| 0x9A | USB2 | 250 | 200 |

To be specific, the processor 120 may execute a C language code (or an algorithm) recorded in the basic input/output system program 131, so as to display a plurality of mark patterns on the circuit board image 200 according the coordinate parameters shown in Table 1. The coordinate parameters are, for example, (300,0), (50,50), and (250,200). Moreover, the coordinate parameters represent the corresponding image starting points of the connection interface images, so that the processor 120 may speculate about related coordinate information of an entire image or image frame corresponding to each of the connection interface images based on the coordinate parameters to depict the mark patterns. As for one of the manners of specifically displaying the mark patterns according to the coordinate parameters with the C language code, people having ordinary skill in the art may refer to the manner of displaying a frame text in the display 150 in a power-on operation performed by a general computer system to guide a user whether to press a corresponding keyboard key, for example, displaying the ESC frame text (the user may enter the "Setup Menu" when correspondingly pressing the ESC key) or the F12 frame text (the user may enter the "Boot Option" when correspondingly pressing the F12 key). Nevertheless, in other embodiments of the disclosure, the mark pattern can be employed by any other shape, configuration, dynamic pattern or remarkable indication other than the frame that is stored in the memory 130 in advance, so that a position configured to display each of the mark patterns may be determined according to each of the coordinate parameters.

In this embodiment, the mark patterns may be frame icons 301 to 303 as shown in FIG. 3. Further, the frame icons 301 to 303 are located on the PCIe connection interface image 241_2, the USB connection interface image 245_1, and the DIMM connection interface image 243_5 corresponding to a PCIe installation, an USB installation, and a memory module detected to be abnormal in the circuit board image 200. As such, the user may instantly and easily know the hardware devices detected to be abnormal corresponding to the PCIe connection interface image 241_2, the USB connection interface image 245_1, and the DIMM connection interface image 243_5b through the display 150, so that it may be convenient for the user to quickly eliminate abnormality of these installations.

It should be noted that, in one embodiment, the status code may be setup by the manufacturer of the basic input/output system program 131, which is not limited by the disclosure. Further, as for the connection interface number, an installation name may be determined by a circuit designer of the circuit board 110 according to a socket and a root port, and the connection interface number may be assigned to a corresponding bus number according to a corresponding and assigned PCIe lane, which is not limited by the disclosure as well.

The power-on self-test program 1311 may detect an abnormal installation. For example, a plurality of hardware devices (e.g., a plurality of memory modules) electrically coupled to the circuit board 110, and the memory modules may be connected to a plurality of DIMM connection interfaces (e.g., corresponding to the DIMM connection interface images 242_1 to 242_8 and 243_1 to 243_8). In an embodiment, the processor 120 may activate the reliability, availability and serviceability (RAS) function through an integrated memory controller (IMC) to scan the plurality of memory modules and determine whether error information or an error log is provided according to at least one of the plurality of memory modules. In this regard, the processor 120 may determine whether at least one of the plurality of memory modules is abnormal according to a memory position corresponding to the error information or the error log, so that the processor 120 may obtain the connection interface number and the status code corresponding to the abnormal memory module. The connection interface position of the memory may refer to a socket, channel, or DIMM connection interface.

For another example, a plurality of hardware devices electrically coupled to the circuit board 110 may include a plurality of PCIe installations, and the plurality of PCIe installations may be connected onto PCIe connection interface images (e.g., corresponding to the PCIe connection interface images 241_1 to 241_4). In an embodiment, since each of the PCIe installations may exhibit the advanced error reporting extended capability, so that the processor 120 may read an advanced error report (AER) of each of the plurality of PCIe installations, so as to determine whether an abnormal PCIe installation is detected through determining whether an error code (error status) is provided in each of the advanced error reports.

Figure 4:
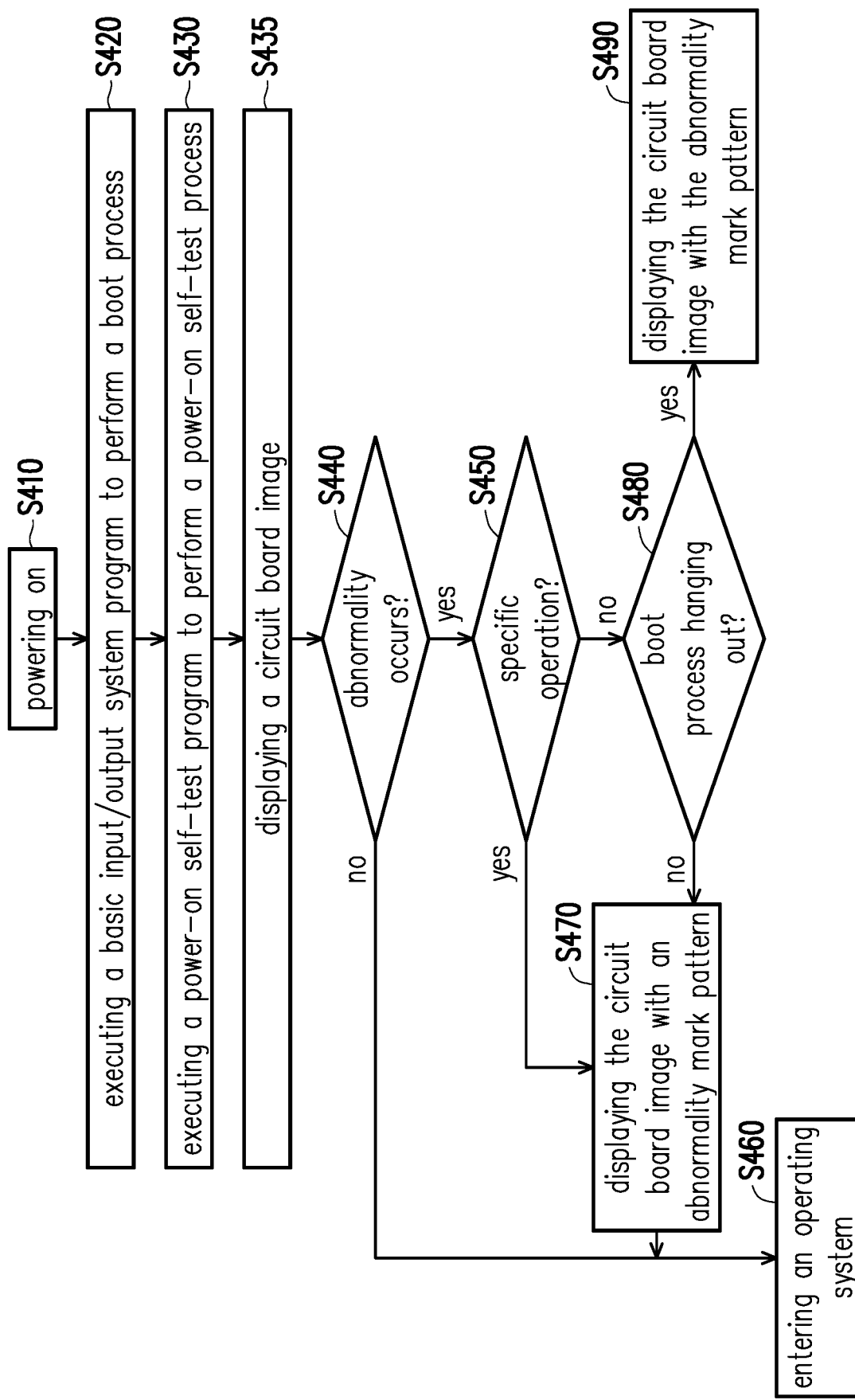
FIG. 4 is an operation flow chart of a computer system according to an exemplary embodiment of the disclosure.

FIG. 4 is an operation flow chart of a computer system according to an exemplary embodiment of the disclosure. With reference to FIG. 1 and FIG. 4, an operation flow of this embodiment may at least be suitable for the computer system 100 of FIG. 1. In step S410, the computer system 100 is powered on. In step S420, the computer system 100 executes the basic input/output system program 131 to perform a boot process. In step S430, the processor 120 reads and executes the power-on self-test program 1311 recorded in the basic input/output system program 131 to perform the power-on self-test process. In step S435, the processor 120 reads the memory 130, so that the display 150 displays the circuit board image 132. In step S440, the power-on self-test program 1311 detects whether any hardware device electrically coupled to anyone of the connection interfaces 140_1 and 140_2 to 140_N is abnormal. If no abnormality occurs, step S460 is performed. In step S460, the computer system 100 keeps on performing the boot process to enter the operating system. If abnormality occurs, step S450 is performed. In step S450, the processor 120 further determines whether a specific operation occurs. If a specific operation occurs, step S470 is performed. In step S470, the display 150 displays the circuit board image 132 with an abnormality mark pattern (such as the frame icon described above), and step S460 is performed after the specific operation ends. In step S460, the computer system 100 keeps on performing the boot process to enter the operating system.

In an embodiment, if the circuit board 110 of this embodiment belongs a circuit board type of a personal computer, the specific operation may be an operation of displaying user selection and activation of the setup menu displayed on the display 150 during the power-on self-test process by the basic input/output system program 131. In another embodiment, if the circuit board 110 is a server circuit board, the specific operation may be an operation of entering a management web interface of a baseboard management controller (BMC). That is, the user may enter the management web interface of a server end through a browser to perform hardware management and monitoring of the baseboard management controller, so as to obtain related hardware device abnormality information found in the power-on self-test process.

In step S450, when the processor 120 determines that no specific operation is provided, step S480 is performed. In step S480, the processor 120 further determines whether the boot process is hanged out owing to abnormality of a hardware device. If no abnormality occurs, step S470 is performed, and the display 150 displays the circuit board image 132 having an abnormality mark pattern. Further, step S460 is performed after the specific operation ends, so that the computer system 100 keeps on performing the boot process to enter the operating system. If abnormality occurs, step S490 is performed. In step S490, the display 150 displays only the circuit board image having the abnormality mark pattern but cannot enter the operating system, so that the boot process is forced to hang out.

In other embodiments of the disclosure, the display made in step S435 does not have to be displayed, and such display may be displayed together with the abnormality mark pattern in step S470 and step S490.

In another embodiment of the disclosure, determination made in step S450 and step S480 does not have to be made, step S470 or step S490 may be performed as long as a hardware device is determined to be abnormal in step S440 to display the circuit board image having the abnormality mark pattern. In other embodiments of the disclosure, only one of the step S450 and step S480 may selectively be presented only. In another embodiment of the disclosure, the order of performing step S450 and step S480 is not limited. For instance, step S450 may be performed before step S480 as shown in FIG. 4, and alternatively, such order may be reversed, so that step S480 may be performed before step S450.

In addition, sufficient teachings, suggestions, and implementation description related to installation details, implementation, and technical features of the computer system 100 of this embodiment may be acquired with reference to the description of the embodiments of FIG. 1 to FIG. 3, and that repeated description is not provided hereinafter.

Figure 5:
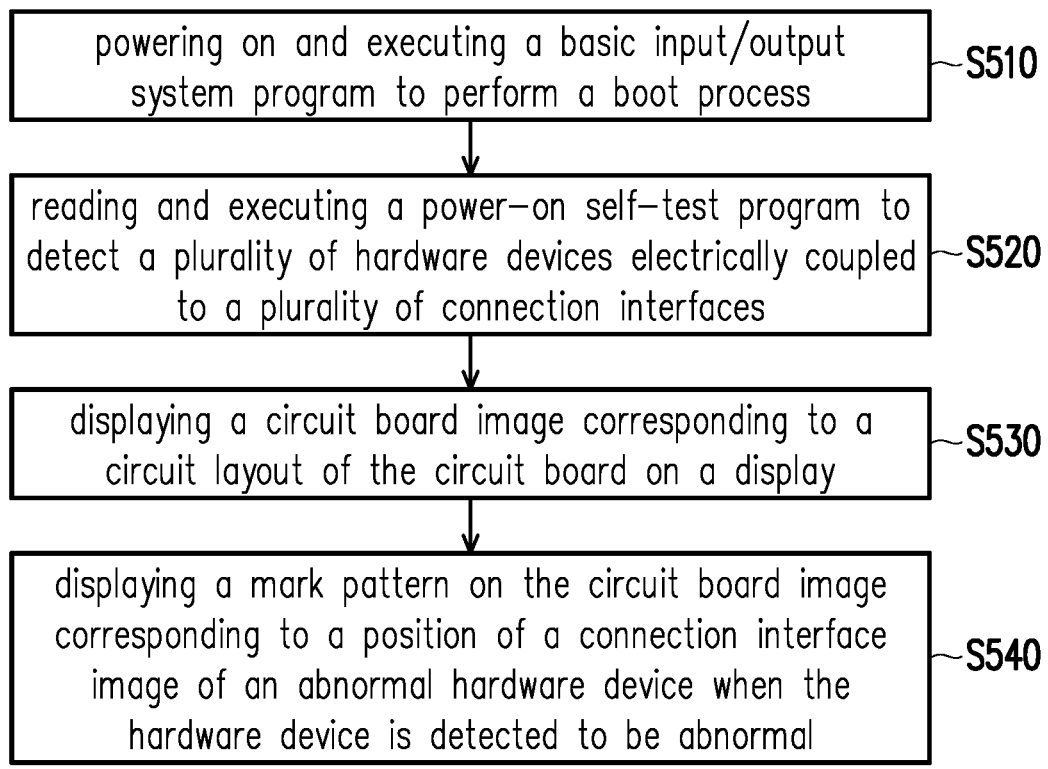
FIG. 5 is a flow chart of basic steps of a debugging method of a computer system according to an exemplary embodiment of the disclosure.

FIG. 5 is a flow chart of basic steps of a debugging method of a computer system according to an exemplary embodiment of the disclosure. With reference to FIG. 1 and FIG. 5, an operation flow of this embodiment may at least be suitable for the computer system 100 of FIG. 1, so that the computer system 100 may perform steps S510 to S540. In step S510, the computer system 100 is powered on, and the processor 120 executes the basic input/output system program 131 to perform the boot process. In step S520, the processor 120 reads and executes the power-on self-test program 132 to detect a plurality of hardware devices electrically coupled to the connection interfaces 140_1 and 140_2 to 140_N. In step S530, the processor 120 reads the circuit board image 132, and the display 150 displays the circuit board image 132 corresponding to the circuit layout of the circuit board 110. In step S540, the display 150 displays a mark pattern on the circuit board image 132 corresponding to a position of the connection interface image of an abnormal hardware device when the hardware device is detected to be abnormal by the processor 120. Therefore, in the operation flow of this embodiment, the computer system 100 may display information related to abnormality of the hardware device through a graphical manner.

In addition, sufficient teachings, suggestions, and implementation description related to installation details, implementation, and technical features of the computer system 100 of this embodiment may be acquired with reference to the description of the embodiments of FIG. 1 to FIG. 4, and that repeated description is not provided hereinafter.

In view of the foregoing, the computer system and the debugging method thereof of the disclosure are capable of automatically detecting whether installation abnormality occurs in the hardware devices electrically coupled to the connection interfaces. Moreover, in the power-on self-test process of the boot process performed by the computer system, the circuit board image marked with the position of the connection interface image corresponding to the hardware device detected to be abnormal is instantly displayed, so that instant and visualized debugging information of the hardware device is provided. Further, in the computer system and the debugging method thereof provided by the disclosure, the graphical debugging information may also be displayed on the setup menu of the basic input/output system program or on the web interface of the baseboard management controller through user selection. Therefore, in the computer system and the debugging method thereof provided by the disclosure, the user may instantly and conveniently obtain the graphical installation abnormality information, so that the user may eliminate the problem of installation abnormality quickly.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A computer system, comprising:
    a circuit hoard, comprising a plurality of connection interfaces configured to be electrically coupled to a plurality of hardware devices;
    a memory, installed on the circuit board, storing a basic input/output system program configured to execute a boot process, wherein the basic input/output system program comprises a power-on self-test program;
    a circuit board image, stored in the memory or in any memory on the circuit board, wherein a circuit layout of the circuit board image corresponds to a circuit layout of the circuit board; and
    a processor, configured to load the basic input/output system program to perform the boot process when the computer system is powered on, read and execute the power-on self-test program to detect the hardware devices electrically coupled to the connection interfaces, display the circuit board image on a display, and display a mark pattern on the circuit board image corresponding to a position of a connection interface image of an abnormal hardware device when the abnormal hardware device is detected to be abnormal, wherein when the abnormal hardware device is detected to be abnormal, the basic input/output system program obtains a coordinate parameter corresponding to the abnormal hardware device, the processor displays the mark pattern on the circuit board image corresponding to the position of the connection interface image of the abnormal hardware device by the display according to the coordinate parameter.

2. The computer system as claimed in claim 1, wherein when the abnormal hardware device is detected to be abnormal, the basic input/output system program further obtains a status code and a connection interface number corresponding to the abnormal hardware device.

3. The computer system as claimed in claim 2, wherein the processor executes a C language code recorded in the basic input/output system program to display the mark pattern on the circuit board image by the display according to the coordinate parameter.

4. The computer system as claimed in claim 3, wherein the mark pattern is a frame icon, and the frame icon is displayed on the connection interface image corresponding to the abnormal hardware device in the circuit board image.

5. The computer system as claimed in claim 1, wherein the hardware devices comprise a plurality of Peripheral Component Interconnect Express (PCIe) installations, and the processor reads an advanced error report of each of the Peripheral Component Interconnect Express installations to determine the abnormal hardware device according to an error status code of the advanced error report.

6. The computer system as claimed in claim 1, wherein the hardware devices comprise a plurality of memory modules, and the processor scans the memory modules through a memory controller to determine the abnormal hardware device according to error information or an error log provided by at least one of the memory modules.

7. The computer system as claimed in claim 1, wherein the display displays the circuit board image when a specific operation is executed, and the processor displays the mark pattern on the circuit board image corresponding to the position of the connection interface image of the abnormal hardware device by the display according to a test result of the power-on self-test program.

8. The computer system as claimed in claim 7, wherein the circuit board is a server circuit board, and the specific operation is to operate a management web interface to enter a baseboard management controller.

9. The computer system as claimed in claim 1, wherein when the computer system is hanged out in the boot process the display displays the circuit board image, and the processor displays the mark pattern on the circuit board image corresponding to the position of the connection interface image of the abnormal hardware device by the display according to a test result of the power-on self-test program.

10. A computer system, comprising:
a circuit board, comprising a plurality of connection interfaces configured to be electrically coupled to a plurality of hardware devices;
a memory, installed on the circuit board, storing a basic input/output system program configured to execute a boot process, wherein the basic input/output system program comprises a power-on self-test program;
a circuit board image, stored in the memory or in any memory on the circuit board, wherein a circuit layout of the circuit board image corresponds to a circuit layout of the circuit board; and
a processor, configured to
load the basic input/output system program to perform the boot process when the computer system is powered on,
read and execute the power-on self-test program to detect the hardware devices electrically coupled to the connection interfaces,
display the circuit board image on a display, and display a mark pattern on the circuit board image corresponding to a position of a connection interface image of an abnormal hardware device when the abnormal hardware device is detected to be abnormal, and
display on the display the circuit board image when a specific operation is executed, and display the mark pattern on the circuit board image corresponding to the position of the connection interface image of the abnormal hardware device by the display according to a test result of the power-on self-test program, wherein the specific operation is to operate a setup menu to enter the basic input/output system program.

11. A debugging method of a computer system, the computer system having a circuit board comprising a plurality of connection interfaces, the debugging method comprising:
powering on and executing a basic input/output system program to perform a boot process;
reading and executing a power-on self-test program to detect a plurality of hardware devices electrically coupled to the plurality of connection interfaces;
displaying a circuit board image corresponding to a circuit layout of the circuit board on a display;
obtaining a coordinate parameter corresponding to a hardware device detected be abnormal; and
displaying a mark pattern on the circuit board image corresponding to a position of a connection interface image of an abnormal hardware device on the display according to the coordinate parameter when the abnormal hardware device is detected to be abnormal.

12. The debugging method as claimed in claim 11, when the abnormal hardware device is detected to be abnormal, the debugging method further comprising:
obtaining a status code and a connection interface number corresponding to the abnormal hardware device; and
obtaining the coordinate parameter according to the status code and the connection interface number.

13. The debugging method as claimed in claim 12, wherein the step of displaying the mark pattern on the circuit board image marked with the position of the connection interface image corresponding to the abnormal hardware device according to the coordinate parameter comprises:
executing a C language code recorded in the basic input/output system program to display the mark pattern on the circuit board image by the display according to the coordinate parameter.

14. The debugging method as claimed in claim 13, wherein the mark pattern is a frame icon, and the frame icon is located on the connection interface image corresponding to the abnormal hardware device in the circuit board image.

15. The debugging method as claimed in claim 11, wherein the hardware devices comprise a plurality of Peripheral Component Interconnect Express (PCIe) installations, and the step of executing the power-on self-test program to detect the hardware devices of the circuit board comprises:

reading an advanced error report of each of the Peripheral Component Interconnect Express installations to determine and detect the abnormal hardware device according to an error status code of the advanced error report.

16. The debugging method as claimed in claim 11, wherein the hardware devices comprise a plurality of memory modules, and the step of executing the power-on self-test program to detect the hardware devices of the circuit board comprises:

scanning the memory modules through a memory controller to determine the abnormal hardware device according to error information or an error log of at least one of the memory modules.

17. The debugging method as claimed in claim 11, further comprising:

determining whether a specific operation is executed; and displaying the circuit board image in response to the determination that the specific operation is executed and displaying the mark pattern on the circuit board image corresponding to the position of the abnormal hardware device by the display according to a test result of the power-on self-test program.

18. The debugging method as claimed in claim 17, wherein the circuit board is a server circuit board, and a specific operation interface is to operate a management web interface enter a baseboard management controller.

19. The debugging method as claimed in claim 11, wherein when the boot process is hanged out, the display displays the circuit board image, and the processor displays the mark pattern on the circuit board image corresponding to the position of the connection interface image of the abnormal hardware device by the display according to a test result of the power-on self-test program.

20. A debugging method of a computer system, the computer system having a circuit board comprising a plurality of connection interfaces, the debugging method comprising:

powering on and executing a basic input/output system program to perform a boot process;

reading and executing a power-on self-test program to detect a plurality of hardware devices electrically coupled to the plurality of connection interfaces;

displaying a circuit board image corresponding to a circuit layout of the circuit board on a display;

determining whether a specific operation is executed, wherein the specific operation is to operate a setup menu to enter the basic input/output system program;

displaying the circuit board image in response to the determination that the specific operation is executed and displaying a mark pattern on the circuit board image corresponding to the position of the abnormal hardware device by the display according to a test result of the power-on self-test program; and displaying the mark pattern on the circuit board image corresponding to a position of a connection interface image of an abnormal hardware device when the abnormal hardware device is detected to be abnormal.

* * * * *